United States Patent [19]

Ueno et al.

[11] Patent Number: 5,254,382
[45] Date of Patent: Oct. 19, 1993

[54] OPTICAL RECORDING MEDIUM

[75] Inventors: Osamu Ueno; Hideo Kobayashi, both of Ebina, Japan

[73] Assignee: Fuji Xerox Co., Ltd., Tokyo, Japan

[21] Appl. No.: 796,827

[22] Filed: Nov. 25, 1991

[30] Foreign Application Priority Data

Nov. 29, 1990 [JP] Japan .................................. 2-325938

[51] Int. Cl.$^5$ ................................................. B32B 3/00
[52] U.S. Cl. ......................................... 428/64; 428/65; 428/457; 428/913; 346/76 L; 346/135.1
[58] Field of Search ................. 428/64, 65, 457, 913; 430/945; 346/76 L, 135.1; 369/288

[56] References Cited

U.S. PATENT DOCUMENTS 5,095,479  3/1992  Harigaya et al. ..................... 369/288

*Primary Examiner*—Patrick J. Ryan
*Assistant Examiner*—Elizabeth Evans
*Attorney, Agent, or Firm*—Oliff & Berridge

[57] ABSTRACT

A optical recording medium comprising a substrate having provided thereon a recording layer whose optical properties reversibly change on application of light or heat or a like means to conduct recording, reproduction, or erasing of information is disclosed, wherein said recording layer comprises a recording material mainly composed of Ge, Sb, Te and In, and is a mixture of Ge-Sb-Te and $In_{1-x}Te_x$ wherein $0.4 < x < 0.6$. The optical recording medium achieves rewriting of information at a high speed and retains recorded information for a prolonged period of time medium whose optical properties change on irradiation with a condensed light beam, such as a laser beam, to conduct recording, reproduction or erasing of information. More particularly, it relates to an improved photo recording medium with which rewriting of information can be carried out at an increased speed and the recorded information can be maintained stably for an extended period of time.

7 Claims, 3 Drawing Sheets

OPTICAL RECORDING MEDIUM

FIELD OF THE INVENTION

This invention relates to a rewritable optical recording medium whose optical properties change on irradiation with a condensed light beam, such as a laser beam, to conduct recording, reproduction or erasing of information. More particularly, it relates to an improved optical recording medium with which rewriting of information can be carried out at an increased speed and the recorded information can be maintained stably for an extended period of time.

BACKGROUND OF THE INVENTION

So-called phase-change type optical recording media which achieve optical recording by utilizing a phase-change between a crystalline phase and an amorphous phase are known as one type of rewritable optical recording media. According to this recording system, a recording layer comprising GeTe, In-Se-Tl-Co, Ge-Sb-Te, etc. as proposed to date is irradiated with a light beam, e.g., a semi-conductor laser beam, to be melted and then quenched to form an amorphous phase, which is usually used as a recorded state. The recorded information can be erased by irradiation of a light beam of lower power than used for recording and keeping the recording material at a crystallization temperature for a prescribed time, thereby returning to its crystalline phase.

It is preferred that a recording material to be used in the phase-change type optical recording media should have a short crystallization time for simplifying the optical system and for improving the irradiation speed and also have high stability in its amorphous phase, that is, a high crystallization temperature for retaining the recorded information for a long time.

Of known recording materials applicable to the phase-change type optical recording media, Ge-Sb-Te satisfying the above requirements has been considered one of the best. That is, Ge-Sb-Te disclosed in JP-A-63-225934 (the term "JP-A" as used herein means an "unexamined published Japanese patent application") is a ternary compound synthesized by mixing $Sb_2Te_3$ which has a short crystallization time but insufficient amorphous phase stability and GeTe which has high amorphous phase stability but a long crystallization time and is deemed to possess properties intermediate between $Sb_2Te_3$ and GeTe.

Nevertheless, Ge-Sb-Te is, though exhibiting some improvements over $Sb_2Te_3$, unsatisfactory in amorphous phase stability, still needing an improvement in retention of recorded information.

Besides, a recording material consisting of In, Ge, Sb and Te is disclosed in JP-A-64-14083, which material is prepared by adding In to a composition of Ge-Sb-Te in the form of a single element. However, this recording material has a long crystallization time since the composition of Ge-Sb-Te has a relatively long crystallization time and further the addition of In in the form of a single element renders the resulting NaCl type crystalline structure unstable.

SUMMARY OF THE INVENTION

An object of this invention is to provide an optical recording medium which achieves rewriting of information at a high speed and stably retains recorded information for a prolonged period of time.

The present invention relates to an optical recording medium comprising a substrate having provided thereon a recording layer whose optical properties reversibly change on application of light, heat, etc., to conduct recording, reproduction, or erasing of information, said recording layer comprising a recording material which is mainly composed of Ge, Sb, Te and In, and is a mixture of Ge-Sb-Te and $In_{1-x}Te_x$ wherein $0.4 \leq x \leq 0.6$.

The recording material is preferably a mixture of $(Ge_yTe_{1-y})_a(Sb_zTe_{1-z})_{1-a}$ and $In_{1-x}Te_x$ wherein $0.4 \leq y \leq 0.6$, $0.3 \leq z \leq 0.5$, $0.4 \leq x \leq 0.6$ and $0.1 \leq a \leq 0.5$.

DETAILED DESCRIPTION OF THE INVENTION

The recording material which can be used in the present invention is mainly composed of four elements, Ge, Sb, Te and In, and has a NaCl type structure in its crystalline phase. Such a recording material includes a material having a composition corresponding to a mixture of Ge-Sb-Te and $In_{1-x}Te_x$ ($0.4 \leq x \leq 0.6$)

Ge-Sb-Te which can be used in the present invention includes a material having a composition corresponding to a mixture of two stoichiometric compounds, GeTe and $Sb_2Te_3$, for example, $Ge_2Sb_2Te_5$ obtained by mixing GeTe and $Sb_2Te_3$ at a molar ratio of 2:1, and a material having a composition corresponding to a mixture of GeTe, $Sb_2Te_3$ and Sb.

Figure 4:
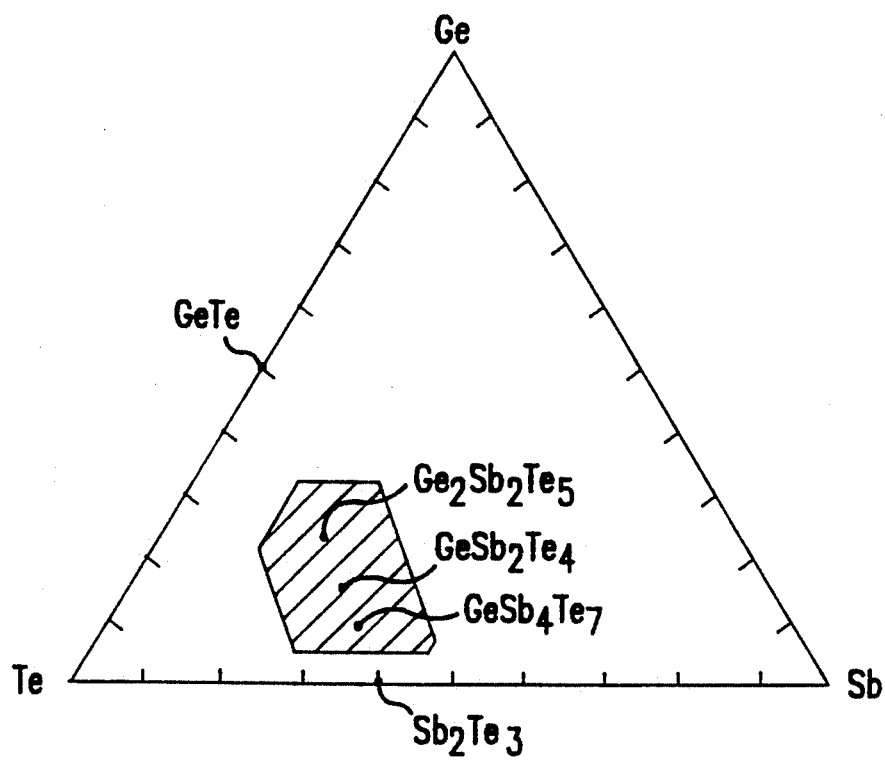
FIG. 4 shows the region of $(Ge_yTe_{1-y})_a(Sb_zTe_{1-z})_{1-a}$ ($0.4 \leq y \leq 0.6$, $0.3 \leq z \leq 0.5$, and $0.1 \leq a \leq 0.5$) of the composition of the preferred recording material of the present invention.

In particular, Ge-Sb-Te preferably has a composition represented by $(Ge_yTe_{1-y})_a(Sb_zTe_{1-z})_{1-a}$ when $0.4 \leq y \leq 0.6$, $0.3 \leq z \leq 0.5$ and $0.1 \leq a \leq 0.5$, as shown in FIG. 4, and examples thereof include $Ge_2Sb_2Te_5$, $GeSb_2Te_4$ and $GeSb_4Te_7$, which are ternary compounds having a NaCl type crystalline structure and exhibit a short crystallization time.

$In_{1-x}Te_x$ which can be used in the present invention includes a stoichiometric compound, InTe, and, in addition, compositions which retain the crystal structure of InTe and exhibit properties substantially equal to InTe, for example, $In_{1-x}Te_x$ wherein x falls within the above-recited specific range, e.g., $In_2Te_3$.

The above-mentioned material having a composition corresponding to a mixture of Ge-Sb-Te and $In_{1-x}Te_x$ includes a material obtained by mixing $Ge_2Sb_2Te_5$ and InTe, a material obtained by mixing $Ge_2Sb_2Te_5$, Sb and InTe, and a material obtained by mixing $Ge_2Sb_2Te_5$ and $In_2Te_3$.

In addition, a material obtained by mixing $Ge_2Sb_2Te_5$ and $In_3SbTe_2$ (which also has a NaCl structure in the crystalline phase) is also employable as a recording material.

The recording material of the present invention preferably has the composition represented by formula (1), (2) or (3):

$$\{(Ge_yTe_{1-y})_a(Sb_zTe_{1-z})_{1-b}\}_{1-b}(In_{1-x}Te_x)_b \quad (1)$$

wherein $0.4 \leq y \leq 0.6$, $0.3 \leq z \leq 0.5$, $0.4 \leq x \leq 0.6$, $0.1 \leq a \leq 0.5$ and $0.01 \leq b \leq 0.3$;

$$\{(GeTe)_A(Sb_2Te_3)_{1-A}\}_{1-B}(InTe)_B \quad (2)$$

wherein $0.25 \leq A \leq 0.75$, $0.02 \leq B \leq 0.35$;

$$(Ge_2Sb_2Te_5)_{1-c}(InTe)_c \quad (3)$$

wherein $0.05 \leq C \leq 0.6$.

If desired, elements other than the above-described four elements, e.g., Ti, Co, Cr, Ni, Zn, Mg, Pt, Pd, Ga, Tl, Al, Cu, Ag, Au, 0, Si, Pb, Sn, As, Bi, Se, S, N, C and F, may be added to these recording materials, as long as the desired properties of the recording materials are not impaired. In this case, the allowable amount of the element to be used for addition is usually not more than 5 atom% based on the total amount of the essential four elements, though greatly dependent on the kind of the element to be added.

Figure 1:
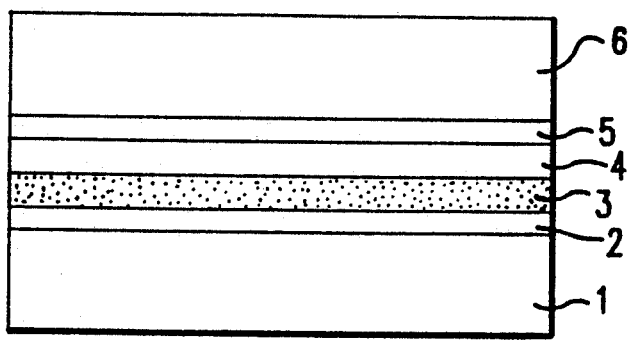
FIG. 1 is a cross-section showing a layer structure of an optical recording medium according to the present invention.

The optical recording medium using the above-described recording material basically comprises a light-transmitting substrate 1 as shown in FIG. 1, e.g., glass, acrylic resins, polycarbonate resins, and epoxy resins, a recording material layer 3 provided on the substrate, and a light-transmission side protective layer 4 comprising ZnS-SiO$_2$, SiO$_2$, ZnS, ZrO$_2$, etc. provided on the recording material layer for the purpose of preventing the recording material layer from deformation till it is melted and then solidified or preventing mechanical damage, oxidation, and the like of the recording material layer.

For protection of the substrate or for reduction of surface reflection of incident light, a light incidence side protective layer 2 comprising ZnS-SiO$_2$, SiO$_2$, ZnS, ZrO$_2$, etc. may be provided between the recording material layer and the substrate. Further, for the purpose of enhancing the functions of the light-transmission side protective layer, it may have thereon an ultraviolet-cured resin layer 5 and further thereon a protective plate 6.

In order to increase the rate of cooling of the recording material layer or to reflect the light beam having passed through the recording material layer thereby increasing the light absorption of the recording material, a reflecting layer comprising Al-Ti, Au, Al, Ag, etc. may be provided on the light-transmission side protective layer.

Each of the light-transmission side protective layer, the incidence side protective layer and the reflecting layer may be composed of a single material or may have a multi-layered structure of a plurality of materials. In optical recording media which perform recording, reproduction, and erasing by irradiation with a light beam from the side opposite to the substrate, the substrate may be, as a matter of course, comprised of a light non-transmitting material, such as aluminum.

The recording material layer is formed by sputtering, vacuum evaporation coating, or the like technique. Sputtering, for example, can be carried out by simultaneous sputtering in which a plurality of targets are employed, and a controlled voltage is applied to each target to synthesize any desired composition and, at the same time, to deposit the thus synthesized composition onto a substrate. Sputtering can also be performed by using a single alloy target corresponding to the desired composition.

Vacuum evaporation can be conducted by co-deposition in which a plurality of vapor sources are prepared and the rate of vaporization of each vapor source is controlled so as to obtain a desired composition which is simultaneously deposited onto a substrate.

The thus formed recording material layer preferably has a thickness of 10 to 200 nm and more preferably 15 to 120 nm.

In the foregoing description and Examples hereinafter described, it is for the sake of convenience that the amorphous phase of the recording material layer is made to correspond to a recorded state, with the crystalline phase to an erased state. Note that no distinction is drawn between recording and erasing. For instance, in cases where overwriting is conducted using one light beam, one of the two phases corresponds to a signal 0, with the other to a signal 1.

According to the present invention, since the recording material mainly comprising Ge, Sb, Te and In has a NaCl type structure in its crystalline phase similarly to Ge-Sb-Te, it possesses the properties of Ge-Sb-Te, i.e., crystallizability at a high rate. Further, the recording material has a composition corresponding to a mixture of Ge-Sb-Te and In$_{1-x}$Te$_x$ ($0.4 \leq x \leq 0.6$), In$_{1-x}$Te$_x$ is ready to have a NaCl type structure as is understood from the report that InTe easily forms a solid solution with GeTe to form a crystalline phase of NaCl type structure. Therefore, the mixture of Ge-Sb-Te and In$_{1-x}$Te$_x$ forms a crystalline phase of NaCl type structure and, as a result, possesses the properties of Ge-Sb-Te in terms of high crystallization rate. On the other hand, InTe has a crystallization temperature as high as 260° C., so that the Ge-Sb-Te/In$_{1-x}$Te$_x$ mixture has a so much increased crystallization temperature and thereby exhibits improved stability in its amorphous phase.

The present invention is now illustrated in greater detail with reference to Examples and Comparative Examples by referring to the accompanying drawings, but it should be understood that the present invention is not deemed to be limited thereto.

EXAMPLE 1

An optical recording medium having a structure shown in FIG. 1 was prepared, comprising a 1.2 mm-thick glass substrate 1 having thereon a 100 nm-thick light incidence side protective layer 2 made of ZnS, a 100 nm-thick recording material layer 3 made of (Ge$_2$Sb$_2$Te$_5$)$_{0.90}$ (InTe)$_{0.10}$, a 200 nm-thick light transmission side protective layer 4 made of ZnS, a 5 to 10 μm-thick ultraviolet cured acrylic resin layer 5, and a 1.2 mm-thick acrylic resin protective plate 6 in this order.

The (Ge$_2$Sb$_2$Te$_5$)$_{0.90}$(InTe)$_{0.10}$ shows a mixture of the two compounds Ge$_2$Sb$_2$Te$_5$ and InTe in the mixing molar ratio of 90:10, corresponding to the composition represented by formula (1) wherein x=0.5, y=0.5, z=0.4, a=0.44 and b=0.02; or by formula (2) wherein A=0.67 and B=0.04. The composition consists of 1.2 atom % of In, 21.7 atom % of Ge, 21.7 atom % of Sb, and 55.4 atom % of Te.

The light transmission side protective layer and the layers thereunder were formed by radio frequency (RF) sputtering. The recording material layer was formed by simultaneous binary sputtering using the two alloy targets, $Ge_2Sb_2Te_5$ and InTe.

After heating the recording material layer up to 300° C. to cause crystallization (so-called initialization) and cooling to room temperature, the protective plate 6 was formed by adhering the acrylic resin plate with an ultraviolet curing acrylic resin adhesive.

EXAMPLE 2

An optical recording medium was prepared in the same manner as in Example 1, except that the recording material layer has a composition of $(Ge_2Sb_2Te_5)_{0.67}(InTe)_{0.33}$, with the InTe content higher than that in Example 1.

The $(Ge_2Sb_2Te_5)_{0.67}(InTe)_{0.33}$ shows a mixture of the two compounds $Ge_2Sb_2Te_5$ and InTe in the mixing molar ratio of 67:33, corresponding to the composition represented by formula (1) wherein $x=0.5$, $y=0.5$, $z=0.4$, $a=0.44$ and $b=0.1$; or by formula (2) wherein $A=0.67$ and $B=0.14$. The composition consists of 5 atom % of In, 20 atom % of Ge, 20 atom % of Sb, and 55 atom % of Te.

EXAMPLE 3

An optical recording medium was prepared in the same manner as in Example 1, except that the recording material layer had a composition of $(Ge_2Sb_2Te_5)_{0.50}(InTe)_{0.50}$, with the InTe content further higher than that in Example 1.

The $(Ge_2Sb_2Te_5)_{0.50}(InTe)_{0.50}$ shows a mixture of the two compounds $Ge_2Sb_2Te_5$ and InTe in the mixing molar ratio of 50:50, corresponding to the composition represented by formula (1) wherein $x=0.5$, $y=0.5$, $z=0.4$, $a=0.44$ and $b=0.18$; or by formula (2) wherein $A=0.67$ and $B=0.25$. The composition consists of 9 atom % of In, 18 atom % of Ge, 18 atom % of Sb, and 55 atom % of Te.

EXAMPLE 4

An optical recording medium was prepared in a similar manner to the procedure in Example 1, except that the recording material layer had a composition of $(Ge_2Sb_2Te_5)_{0.75}(In_3SbTe_2)_{0.25}$.

The $(Ge_2Sb_2Te_5)_{0.75}(In_3SbTe_2)_{0.25}$ shows a mixture of the two compounds $Ge_2Sb_2Te_5$ and $In_3SbTe_2$ in the mixing molar ratio of 75:25, and the composition consists of 9 atom % of In, 18 atom % of Ge, 21 atom % of Sb, and 52 atom % of Te.

COMPARATIVE EXAMPLE 1

An optical recording medium was prepared in the same manner as in Example 1, except that the recording material layer had a composition of $Ge_2Sb_2Te_5$. The recording material layer was formed by using $Ge_2Sb_2Te_5$ as a single target in sputtering.

COMPARATIVE EXAMPLE 2

An optical recording medium was prepared in the same manner as in Example 1, except that the recording material layer had a composition of $Ge_2Sb_2Te_5Sb$. The recording material layer was formed by using $Ge_2Sb_2Te_5$ and Sb as two targets in sputtering.

Properties of the optical recording media prepared in the foregoing Examples and Comparative Examples were evaluated in terms of crystallization temperature (indicative of stability of the amorphous phase) and crystallization time (indicative of recording speed) as described below.

Measurement

Semiconductor laser light pulses having a wavelength of 830 nm were condensed on a test sample through an objective lens having a numerical aperture of 0.5, and the performance of recording (conversion to amorphous phase) and erasing (crystallization) were evaluated by measuring the crystallization temperature and the crystallization time as follows.

Crystallization Time

Reflectance of optical recording media decreases upon irradiation of recording light pulse and restores to an initialized level when irradiated with erasing pulse. Accordingly, the pulse width required for completely restoring the reflectance to the level after initialization was taken as a crystallization time.

Crystallization Temperature

Figure 2:
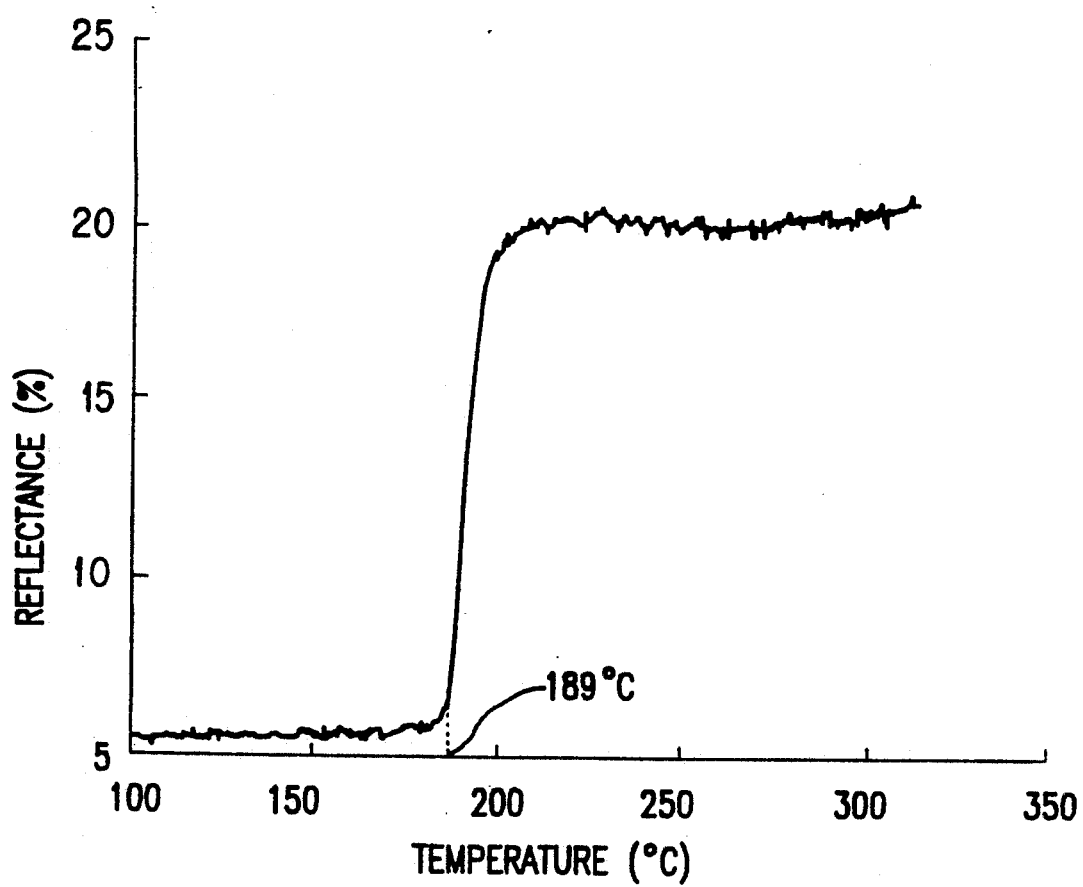
FIG. 2 is a graph of temperature vs. reflectance of the optical recording medium prepared in Example 3.

Using test samples having on the glass substrate 1 only three layers, the light incidence side protective layer 2, the recording material layer 3 and the light transmission side protective layer 4, formed according to the procedures as in the foregoing Examples and Comparative Examples, the reflectance of each of the test samples was monitored while heating at the rise speed of 20° C./min. The crystallization temperature herein defined is the temperature at which the reflectance comes to rise as shown in FIG. 2.

The results obtained are shown in Table 1 below.

Further, the crystal structure of the recording material layer of the optical recording media as prepared in the foregoing Examples was examined in the following manner.

Crystal Structure

Using test samples having on the glass substrate only two layers, a 100 nm-thick $SiO_2$ layer and a 100 nm-thick recording material layer formed in sequence according to the procedures as in the Examples, change in crystal structure was examined with a X-ray diffractometer after heating each of the test samples to 300° C. and then cooling it to room temperature.

TABLE 1

| Example No. | Crystallization Temperature (°C.) | Crystallization Time (ns) |
|---|---|---|
| 1 | 169 | 30 |
| 2 | 181 | 40 |
| 3 | 189 | 60 |
| 4 | 181 | 70 |
| Comparative Example 1 | 162 | 30 |
| Comparative Example 2 | 177 | 120 |

It can be seen from the results in Table 1, that as the InTe content in the recording material increases, the optical recording medium (Examples 1 to 4) according to the present invention increases its crystallization temperature and therefore exhibits so improved stability in its amorphous phase as compared with the conventional optical recording medium (Comparative Example 1). On the other hand, while the crystallization time slightly increases with the increase in InTe ratio, the optical recording media (Examples 1 to 4) of the present invention are still believed to have sufficiently high rate of crystallization seeing that crystallization times of 100 ns or less suffice for practical use. This is also proved by comparison with the crystallization time of Comparative Example 2.

Figure 3:
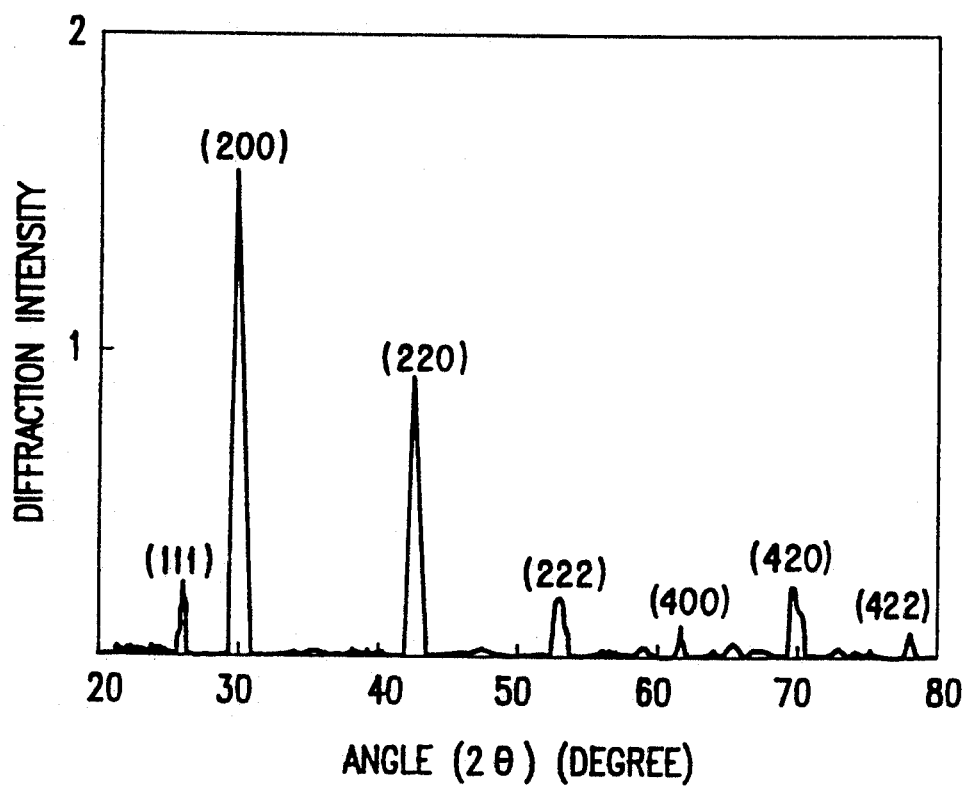
FIG. 3 is an X-ray diffraction spectrum of the optical recording medium prepared in Example 2.

The recording material of each optical recording media of the present invention showed a NaCl type structure in its crystalline phase, as shown in FIG. 3. This appears to be the reason for their short crystallization time.

As described above, the optical recording media according to the present invention have an increased crystallization temperature thereby exhibiting a stabilized amorphous phase while achieving crystallization at a high rate as the property of Ge-Sb-Te.

Thus, the optical recording media of the present invention accomplishes high rate rewriting of information and retain the recorded information for a prolonged period of time.

While the invention has been described in detail and with reference to specific examples thereof, it will be apparent to one skilled in the art that various changes and modifications can be made therein without departing from the spirit and scope thereof.

What is claimed is:

1. An optical recording medium comprising a substrate having provided thereon a recording layer whose optical properties reversibly change on application of light or heat to conduct recording, reproduction, or erasing of information, said recording layer comprising a recording material selected from the group consisting of $$\{(Ge_yTe_{1-y})_a(Sb_zTe_{1-z})_{1-a}\}_{1-b}(In_{1-x}Te_x)_b,$$
$$\{(GeTe)_A(Sb_2Te_3)_{1-A}\}_{1-B}(InTe)_B \text{ and}$$
$$(Ge_2Sb_2Te_5)_{1-C}(InTe)_C$$

wherein $0.4 \leq y \leq 0.6$, $0.3 \leq z \leq 0.5$, $0.4 \leq x \leq 0.6$, $0.1 \leq a \leq 0.5$, $0.01 \leq b \leq 0.3$, $0.25 \leq A \leq 0.75$, $0.02 \leq B \leq 0.35$ and $0.05 \leq C \leq 0.6$.

2. An optical recording medium as in claim 1, wherein said recording material has the composition represented by $$\{(Ge_yTe_{1-y})_a(Sb_zTe_{1-z})_{1-a}\}_{1-b}(In_{1-x}Te_x)_b$$

wherein $0.4 \leq y \leq 0.6$, $0.3 \leq z \leq 0.5$, $0.4 \leq x \leq 0.6$, $0.1 \leq a \leq 0.5$ and $0.01 \leq b \leq 0.3$.

3. An optical recording medium as in claim 1, wherein said recording material has the composition represented by $$\{(GeTe)_A(Sb_2Te_3)_{1-A}\}_{1-B}(InTe)_B$$

wherein $0.25 \leq A \leq 0.75$ and $0.02 \leq B \leq 0.35$.

4. An optical recording medium as in claim 1, wherein said recording material has the composition represented by $$(Ge_2Sb_2Te_5)_{1-C}(InTe)_C$$

wherein $0.05 \leq C \leq 0.6$.

Figure 5:
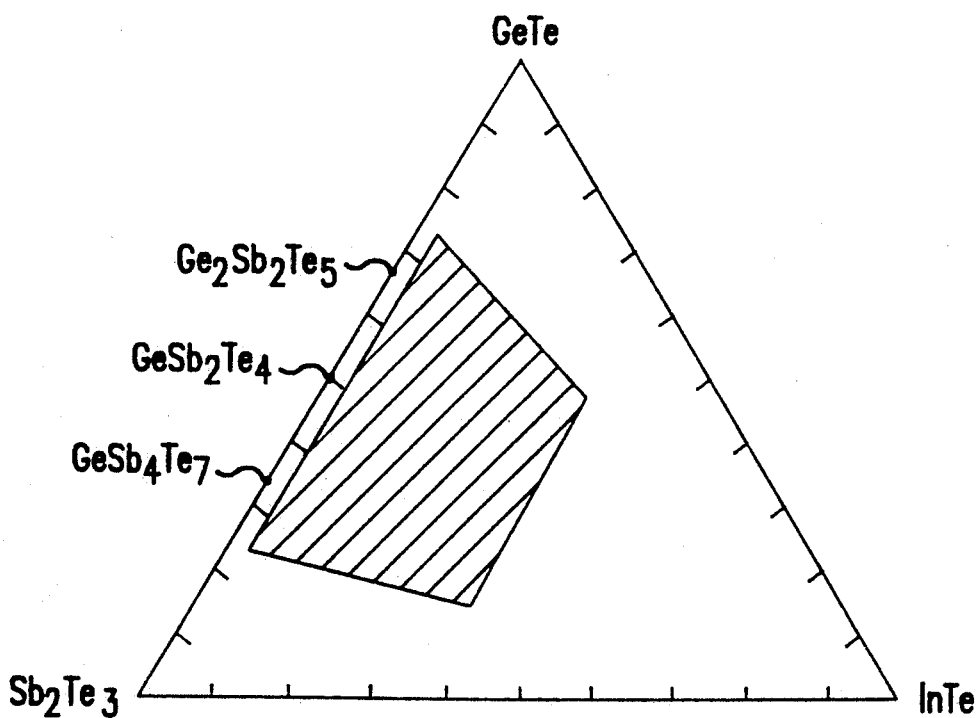
FIG. 5 shows the region of $\{(GeTe)_A(Sb_2Te_3)_{1-A}\}_{1-B}(InTe)_B$ ($0.25 \leq A \leq 0.75$ and $0.02 \leq B \leq 0.35$) of the composition of a preferred recording material of the present invention.

5. An optical recording medium as in claim 1, wherein aid recording material has the composition fallen within both the regions, at the same time, indicated with slant lines in FIGS. 4 and 5 and on the lines surrounding the regions.

6. An optical recording medium as in claim 1, which further contains up to 5 atom %, based on the total amount of Ge, Sb, Te and In, of an element or elements selected from the group consisting of Ti, Co, Cr, Ni, Zn, Mg, Pt, Pd, Ga, Tl, Al, Cu, Ag, Au, O, Si, Pb, Sn, As, Bi, Se, S, N, C and F.

7. An optical recording medium comprising a substrate having provided thereon a recording layer whose optical properties reversibly change on application of light or heat to conduct recording, reproduction, or erasing of information, said recording layer comprising a recording material which is mainly composed of Ge, Sb, Te and In and is a mixture of Ge-Sb-Te and $In_3Sb-Te_2$.

* * * * *